United States Patent Office

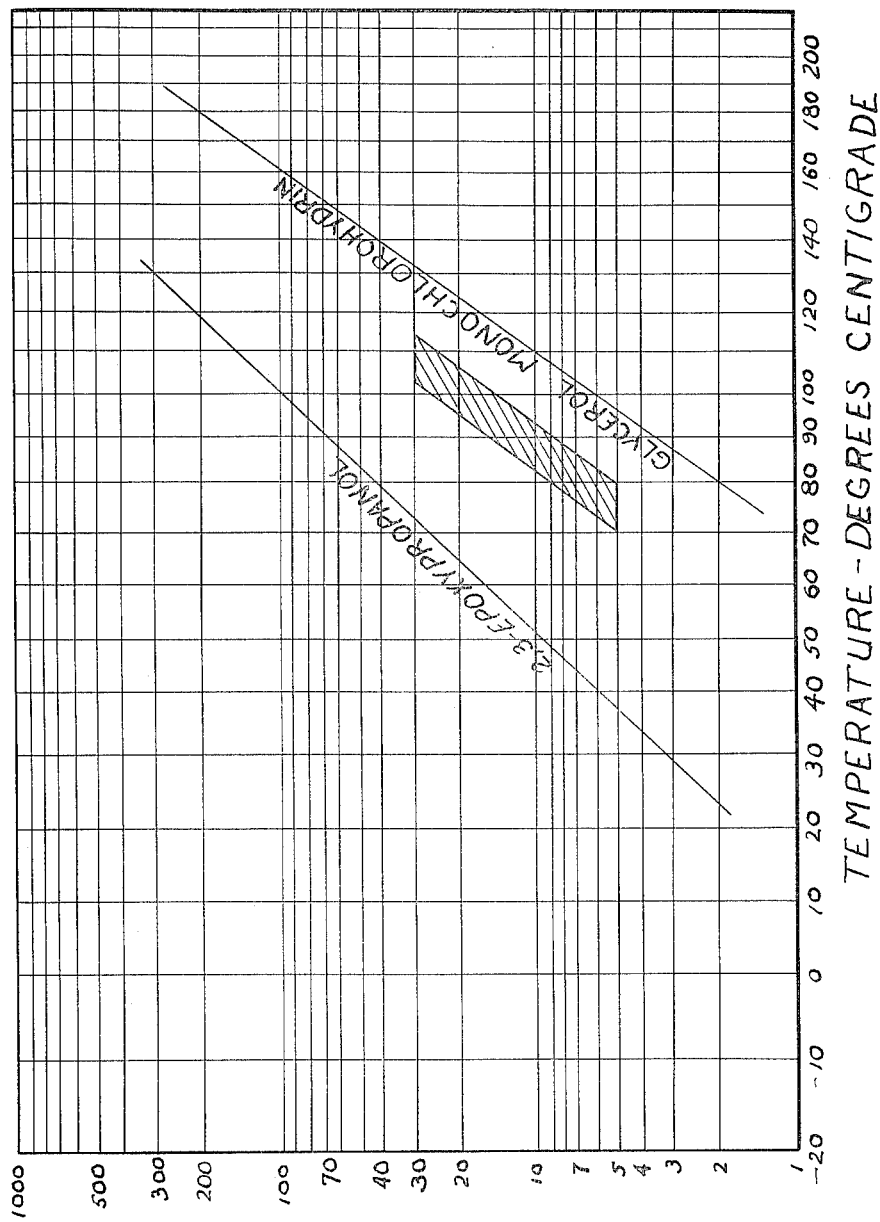

3,247,227
Patented Apr. 19, 1966

3,247,227
EPOXIDATION OF ORGANIC HALOHYDRINS
George T. White, Asheville, N.C., assignor, by mesne assignments, to The Ott Chemical Company, Muskegon, Mich., a corporation of Delaware
Filed Apr. 24, 1962, Ser. No. 189,747
2 Claims. (Cl. 260—348.6)

This invention relates to a new process for the epoxidation of organic compounds. More particularly this invention is concerned with a novel process for the epoxidation of organic compounds, e.g. organic halohydrins, using sodium carbonate.

Epoxy compounds have utility in many fields because of the highly reactive oxygen bridge. Thus, such compounds have been used to dehydrate or deacidify various oils. Further, such compounds are used as starting materials in the preparation of various resins because of the reactive oxygen bridge. Further, because of the epoxide activity, such compounds are useful as intermediates in the preparation of other compounds which have commercial utility in many fields.

The problems encountered in the prior art processes for the preparation of epoxide compounds are related to the reactivity of the epoxide or oxygen bridge. The characteristic of these compounds which is responsible for their utility is also responsible for the difficulty encountered in the preparation. In the prior art methods for the preparation of these compounds there is a tendency for the epoxides to decompose or polymerize. The reason for this, which will be made further apparent, is that the epoxide compound remains in the reaction system (after production) for substantial periods of time.

What takes place in a typical reaction to form an epoxide compound is as follows:

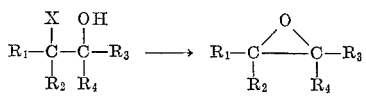

wherein $R_1$, $R_2$, $R_3$ and $R_4$ are various substituents such as hydrogen, halo, hydroxyl and/or organic groups and X is a halo group.

The first problem encountered occurs because of the fact that both the reactant and the product are present in equilibrium in the reaction system in the presence of a base. Thus a further reaction takes place as follows:

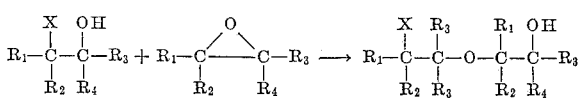

wherein $R_1$, $R_2$, $R_3$, $R_4$ and X are as before and resulting in a dimerization or polymerization product of the reactants. Further, this dimerization product has an active hydrogen which is available to cause polymerization by reacting with more of the epoxide compound. Any other active hydrogens available on any of the $R_1$, $R_2$, $R_3$ and $R_4$ groups are also available for linear polymerization or cross-linking and gelation. It is readily apparent that prior art processes wherein the epoxide compound product remains in the reaction vessel results in poor yields of the desired epoxide compound because of the high yields of dimerization and polymerization products. It is apparent that the utility of the epoxide compounds in the resin field tends to make their production difficult.

Another problem which is encountered in prior art processes arises from the use of bases which form water as a reaction product. An example of this type of base is sodium hydroxide. A typical example of the prior art method of preparation of an epoxide compound using this base is as follows:

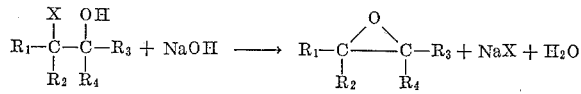

wherein $R_1$, $R_2$, $R_3$, $R_4$ and X are as before. The problem then arises because of the presence of water in the product which destroys the epoxide compound as follows:

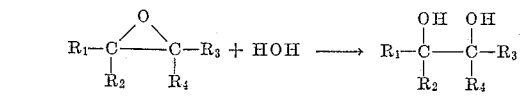

wherein $R_1$, $R_2$, $R_3$ and $R_4$ are as before. Further, the active hydrogens in the dihydroxy compound will enter into further dimerization, polymerization and water decomposition.

It is therefore an object of this invention to produce the epoxide compounds in high yield by reducing dimerization, polymerization, and decomposition and combination by water.

Other objects, including simplicity and economy over existing processes, will become increasingly apparent to those skilled in the art as the description proceeds.

In the figure: The figure is a log vapor pressure vs. log temperature plot which may be used in the preparation of the specific epoxide compound, 2,3-epoxypropanol, illustrating the plotted points of vapor pressure in millimeters of mercury for the starting compound glycerol monochlorohydrin (1-chloro-2,3-dihydroxypropane) and the product 2,3-epoxypropanol at various temperatures in degrees centigrade and further illustrating the area of optimum vapor pressure-temperature relationship by cross hatching. It is apparent from this figure that at a given pressure, the product 2,3-epoxypropanol, will boil at a lower temperature than the starting compound glycerol monochlorohydrin. This is an essential requirement for the starting organic halohydrin and product organic epoxide compounds in the new process, as will be apparent from the following description.

In general, the present invention is a process for the epoxidation of an organic halohydrin which comprises the reacting of a liquid organic halohydrin with a substantially non-water forming inorganic base at a temperature above the boiling point, under the pressure conditions of the reaction system, of the organic epoxide to be formed; and separating a vaporous organic epoxide from the reaction system.

In particular, this invention relates to a process whereby a molar excess of substantially non-water forming inorganic base is agitated in a reduced pressure system while the reactant liquid organic halohydrin is introduced into the system and the epoxide product formed is immediately taken from the system as a vapor and condensed.

Basically the process takes advantage of the fact that the reactant organic halohydrin which is introduced will not vaporize at the temperature and pressure of the system. The heated non-water forming base and the organic halohydrin remain in the reaction system while the epoxide compound product is vaporized upon formation and condensed away from the reaction mass. Thus it is important that the organic halohydrin have a higher boiling point, at a given pressure, than the epoxide compound which is formed as the product, and also that it remain a liquid while the epoxide compound is in the vapor state.

A typical product which can be formed by the process of this invention is 2,3-epoxypropanol from the starting material glycerol monochlorohydrin. The figure illustrates the boiling point in degrees centigrade of the two compounds at various pressures in millimeters of mercury. It is apparent that at a given pressure the boiling point of glycerol monochlorohydrin is greater than that of 2,3-epoxypropanol.

Thus when glycerol monochlorohydrin is reacted with substantially non-water forming inorganic bases such as sodium carbonate, the reaction is thought to proceed as follows:

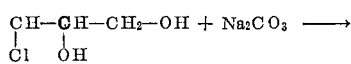

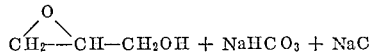

and if performed in accordance with this invention at a pre-selected pressure and at temperature higher than the boiling point of 2,3-epoxypropanol, but less than that of the glycerol monochlorohydrin, this epoxide compound product is vaporized from the reaction mass upon formation. The substantially pure 2,3-epoxypropanol can then be condensed to the liquid state, away from contamination with the reaction mass.

In the preferred process, the pressure of the system is reduced. This technique has the advantage of preventing the moisture in the air from entering the system and reacting with the epoxide compound product to form a dihydroxy compound. Further, it is believed that maximum yields are obtained by the use of reduced pressures. For example, in the glycerol monochlorohydrin-2,3-epoxypropanol system illustrated in the figure, the optimum vapor pressure-temperature conditions are illustrated by the crosshatched area. Such optimum conditions for other systems within the scope of this process can easily be determined by those skilled in the art.

In general, any substantially non-water forming inorganic base may be used. Bases such as sodium hydroxide form water upon reaction with an organic halohydrin and this water tends to form a dihydroxy compound when reacted with the epoxide compound reducing the yield of the epoxide, and therefore are not used. Examples of non-water forming bases which do function properly in the reaction system are: calcium carbonate, potassium carbonate, magnesium oxide, sodium oxalate, sodium phosphate and sodium carbonate. However, sodium carbonate is preferred in this process.

Sodium carbonate has many characteristics which make it a very desirable base. This base does not "poison" during the reaction by the adsorption of the reaction materials of the system, causing the reaction to stop. The problem of "poisoning" has been encountered with the other substantially non-water forming bases and it can be cured somewhat by increasing the agitation of the base during the reaction in such a manner as to shear the solid particles of the base continuously creating a new surface for reaction.

The excess sodium carbonate and the sodium bicarbonate formed can be recovered after reaction. The sodium bicarbonate can be converted to sodium carbonate by heating. Thus sodium carbonate can be recycled for reuse and this is a further reason why this material is preferred.

Further, it is thought that the sodium bicarbonate produced in the reaction to form the epoxide is reconverted to sodium carbonate when heated during the reaction and carbon dioxide gas is given off. This reaction would tend to replenish the supply of sodium carbonate in the system and would be another reason why sodium carbonate is preferred.

In the preferred process a dense grade of sodium carbonate is used. Further, the sodium carbonate is of medium mesh. This is to prevent the sodium carbonate from being forced over with the vaporous compound product during the reaction. The fine mesh, less dense sodium carbonate seems to improve yields but should be employed with a suitable reflux column in order to be used satisfactorily.

The sodium carbonate should be of good grade and relatively free from water. Impure sodium carbonate has a tendency to destroy the vapor pressure-temperature relationship required for separation of the epoxide compound. Water present in the sodium carbonate will contaminate the product and react with the epoxide product. Further, this water is removed from the sodium carbonate by violent dehydration during the reaction and should be avoided for safety reasons.

In the preferred process a molar excess over the amount theoretically required of the non-water forming base is used. This is because the surface nature of the organic halohydrin reaction on the particles of the base coupled with the tendency of the particles of most bases to adsorb the materials of the reaction system on the surface. Sodium carbonate does not have this tendency to adsorb the materials of the reaction system as discussed above and is therefore preferred.

In the preferred process the organic halohydrin is introduced into the system in small amounts and allowed to react. This has the advantage of preventing the organic halohydrin from being carried over with the product and thus possibly resulting in a dimerization or polymerization reaction with the epoxide product.

Illustrative of the process for the preparation of epoxide compounds are the procedures used for the preparation of 2,3-epoxypropanol in Example I.

*Example I*

A two liter, three-necked, round-bottomed flask equipped with a stirrer, dropping funnel, fractionating column, condensors, two thermometers (one in flask and one in column head), receiver and vacuum pump were used for equipment.

Into the flask was introduced 200 grams of dense sodium carbonate which was a 20% mole excess over the theoretical requirements. Glycerol monochlorohydrin (175 grams) was placed in the stoppered dropping funnel and the funnel was closed. The pressure was reduced in the closed system to approximately 10 mm of mercury. The base was heated and maintained at a temperature of 90° C. These conditions fall within the crosshatched area of the figure. The sodium carbonate was then agitated by means of the stirrer.

The glycerol monochlorohydrin was introduced slowly while the temperature and pressure were being regulated to maintain the system within the limits of the optimum vapor pressure-temperature conditions shown in the crosshatched area of the figure. At this point 2,3-epoxypropanol was being collected in the receiver. The distillation was continued until the temperature at the head of the fractionating column dropped below the boiling point of the 2,3-epoxypropanol product. The product in the receiver was then collected and was found to weigh 117 grams.

This product contained ninety-two percent (92%) 2,3-epoxypropanol, seven percent (7%) water and one percent (1%) of other contaminants. The water was partially removed from this product by azeotropic distillation with isopropyl alcohol. The final product contained ninety-seven percent (97%) 2,3-epoxypropanol, one and one-half percent (1.5%) water and one percent (1%) of other contaminants. The overall percent yield based upon the glycerol monochlorohydrin used was ninety-one and eight tenths percent (91.8%).

Larger molar excesses of sodium carbonate were used repeating the above example but no advantage was found and the yield was actually reduced.

It can be seen from the above example that the process of this invention can be used to prepare organic epoxides in very high yield. The contaminants caused by the competing side reactions discussed above are kept to an absolute minimum as shown by the presence of only one percent (1%) contaminants other than water in the above example.

Many epoxide compounds can be produced by the process of this invention in high yield. All that is required is that the reactant organic halohydrin have the radical:

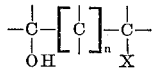

where X is a halogen and $n$ is an integer from 0 to 6 and the epoxide product will have the radical:

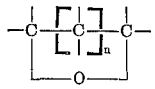

Thus, where $n$ is zero, the 1,2-epoxy or 2,3-epoxy compounds are prepared. Examples are: 1,2-epoxy-2,3-propylene; 1,2-epoxy-3,4-butene, 1,2-epoxy-2,3-butene; 2,3-epoxy-3,4-butene; 1,2-epoxypropane; 1,2-epoxybutane; 2,3-epoxybutane; 1,2-epoxypentane; 2,3-epoxypropanol; 1,2-epoxybutanol; and 1,2-epoxypentanol. Where $n$ is equal to 1–6, the following compounds can be prepared; tetrahydrofuran, 1,3-epoxypropane; 1,3-epoxypropylene; tetrahydropyran; 1,4-oxy-2,3-butene; furan; 1,6-oxyhexane. These compounds are illustrative of those that may be prepared by this process.

As various changes could be made in the above described process without departing from the scope of my invention, it is intended that all matter contained in the above description shall be interpreted as illustrative and not in a limiting sense.

I claim:

1. The process for continuously producing 2,3-epoxy propanol which comprises: anhydrously reacting glycerol monochlorohydrin with a molar excess of particles of sodium carbonate which is relatively free of water to form 2,3-epoxy propanol in a reaction zone, the reaction zone being maintained at a temperature between about 70° C. and about 110° C. and at a pressure between about 5 mm. and about 30 mm. of mercury and the glycerol monochlorohydrin being introduced into the reaction zone in small amounts and allowed to react with the sodium carbonate, said 2,3-epoxy propanol being vaporized from the reaction zone immediately upon formation and any unreacted glycerol monochlorohydrin remaining in the reaction zone.

2. Claim 1 wherein the sodium carbonate is of a dense grade and medium mesh.

References Cited by the Examiner

UNITED STATES PATENTS

| 1,446,872 | 2/1923 | Brooks | 260—348.6 |
| 1,792,668 | 2/1931 | Weber et al. | 260—348.6 |
| 2,860,146 | 11/1958 | Furman et al. | 260—348.6 |
| 2,943,095 | 6/1960 | Farnham et al. | 260—348.6 |

FOREIGN PATENTS

| 142,908 | 8/1951 | Australia. |

OTHER REFERENCES

Bradley et al.: J. Chem. Soc. (London), (1951), pp. 1589–1598.

WALTER A. MODANCE, *Primary Examiner.*

IRVING MARCUS, *Examiner.*